3,029,200
REMOVAL OF RADIOACTIVE IONS
FROM WATERS
Wyatt B. Silker, Kennewick, Wash., assignor to the United States of America as represented by the United States Atomic Energy Commission
No Drawing. Filed Nov. 16, 1960, Ser. No. 69,774
2 Claims. (Cl. 210—24)

This invention deals with a process for the removal of radioactive salts from highly dilute aqueous solutions.

In the field of neutronic reactors, waters or solutions are obtained that are contaminated with radioactive activation products formed by neutron bombardment and therefore are hazardous. For instance, the cooling water used in nuetronic reactors often is contaminated with such activation products, of which $P^{32}$ and $As^{76}$ are particularly dangerous on account of their intermediate half-lives. Also, in the processing of solutions obtained by dissolving neutron-bombarded fissionable material in acid for the extraction or precipitation of uranium and plutonium and/or thorium, waste solutions are obtained that contain activation products in a highly dilute form. It is necessary to remove the bulk of these activation products from these waters prior to disposal into the ground or rivers, lakes and the like, because plant and animal life would be impaired or destroyed and human beings be poisoned by direct or indirect intake of such radioactivity.

Investigations have been made for the removal of the activation products from such dilute aqueous media by adsorption. Various materials have been tested for this purpose, for instance, anion exchange resins and iron-base minerals. These materials, however, showed various drawbacks. For instance, the iron minerals gradually lose their efficiency as they are being used. Anion exchange resins yielded satisfactory results, but proved too expensive for the immense quantities of water that have to be treated.

It is an object of this invention to provide a process for the removal of activation products from highly dilute solutions by sorption which is inexpensive.

It is another object of this invention to remove activation products from dilute solutions by sorption on a material that is self-regenerating during operation.

It is finally also an object of this invention to provide a process for the removal of activation products from aqueous solutions by sorption which can be operated on a continuous basis, because it does not have to be interrupted for regeneration of the sorbent material.

It has been found that aluminum metal in disintegrated form, for instance in the form of turnings, when contacted with the solutions or waters of the kind described, removes these activation products to a high degree practically without losing its capacity. In fact, frequently the sorptive capacity increases during operation. No explanation can be given for these phenomena with certainty; however, it is believed that the aluminum is oxidized on the surface, probably to alumina monohydrate, and that this alumina has a high affinity to the radioactive salts. Also, some of this alumina monohydrate possibly reacts further with the phosphorus present in the water and forms an aluminum phosphate, which might be the cause of the increased efficiency after some time of operation. As the activation products are taken up by the oxide or salt, the film peels or crumbles off and further layers are available for oxidation and sorption.

The efficiency of the process is greater if the aluminum is contacted with the water at elevated temperature, for instance, if the water has a temperature of 70° C. and above. This is approximately the temperature at which the water leaves certain reactors.

The process is preferably carried out in a continuous manner by passing the water through a column or bed packed with the disintegrated aluminum.

The flow rates of the solution through the aluminum turnings or other aluminum particles affect the operation to a certain degree only. Flow rates of from 40 to 900 cm./min. through the column have been used and found operative. However, it was preferred that the linear flow rate does not exceed 100 cm./min., because then the removal of the radioactive isotopes is considerably better.

The maximum total removal usually occurred after the aluminum turnings had been used for about 600 hours. Then the sorption had increased from the initial 50% to 75%.

In the following, a few examples are given to illustrate the process of this invention.

*Example I*

A Pyrex column of 47 mm. inner diameter was packed with 3-mil thick turnings of 2S aluminum; 180 grams of the aluminum turnings were used, and the column height was 93 cm. Water containing radioactive isotopes was passed through the column at a linear speed of 218 cm./min. The temperature of the water ranged between 76 and 78° C. The feed water as well as the effluent were analyzed. It was ascertained that at the equilibrium stage, that is, when the concentrations of the effluent remained constant, the following percentages of the various isotopes had been removed: $P^{32}$ 14%; $Mn^{56}$ 19%; $Cu^{64}$ 27%; $Zn^{65}$ 25%; $As^{76}$ 13%; $La^{140}$ 35%; $Eu^{152}$ 25%; $Sm^{153}$ 29%; and $Np^{239}$ 4%.

After this a new supply of radioactive cooling water was passed through the same column, however at the slower velocity of 87.2 cm./min. This time the water had a temperature of about 74° C. The effluent was analyzed with regard to the $Cu^{64}$ only, and it was found that by then 43% of the $Cu^{64}$ had been removed.

*Example II*

A column of the same dimensions and charged with the same type of aluminum turnings was again contacted with cooling water in a continuous flow as described in Example I. This time the flow rate was 436 cm./min.; the temperature of the water was the same as in the first run of Example I. At equilibrium, the percentages sorbed on the aluminum were: $P^{32}$ 13%; $Mn^{56}$ 15%; $Cu^{64}$ 23%; $Zn^{65}$ 20%; $As^{76}$ 10%; $La^{140}$ 20%; $Eu^{152}$ 20%; $Sm^{153}$ 19%; and $Np^{239}$ 5%.

After this, again a new supply of radioactive cooling water was passed through the same column, however at the slower velocity of 87.2 cm./min. By this time the water had a temperature of about 74° C. The second effluent was only analyzed with regard to the $Cu^{64}$, and it was found that by then 44% of the $Cu^{64}$ had been removed.

*Example III*

Another experiment was carried out under conditions identical with those of the foregoing examples with the exception that the flow rate this time was 872 cm./min. The percentages of sorption were: $P^{32}$ 9%; $Mn^{56}$ 10%; $Cu^{64}$ 16%; $Zn^{65}$ 10%; $As^{76}$ 11%; $La^{140}$ 11%; $Eu^{152}$ 18%; $Sm^{153}$ 18%; and $Np^{239}$ 3%.

After equilibrium, more activation-products-containing water was passed through the column at a flow rate of 43.6 cm./min. Analysis of the second effluent then showed that in the second pass 77% $Mn^{56}$, 62% $Cu^{64}$, 49% $As^{76}$, 48% $La^{140}$, 55% $Eu^{152}$, and 50% $Sm^{153}$ had been removed. The phosphorus, zinc and neptunium removal was not tested in this run.

Example IV

For the sake of comparison one experiment will now be described in which radioactive cooling water was passed over turnings of stainless steel (404L). About the same column height, to be exact of 96 cm., was used; for this, 820 grams of steel were required. The flow rate was 436 cm./min., and the water again had a temperature of between 76 and 78° C. Here are the adsorption efficiencies obtained: $P^{32}$ 9%; $Mn^{56}$ 4%; $Cu^{64}$ 13%; $Zn^{65}$ 8%; $As^{76}$ 13%; $La^{140}$ 10%; $Eu^{152}$ 17%; $Sm^{153}$ 15%; and $Np^{239}$ 1%.

It will be understood that this invention is not to be limited to the details given herein but that it may be modified within the scope of the appended claims.

What is claimed is:

1. A process of removing neutron-reaction products selected from the group consisting of phosphorus, arsenic, manganese, copper, zinc, lanthanide rare earths and actinide ions from an aqueous solution, comprising passing said solution over particles of aluminum metal whereby said activation products are taken up by the aluminum, and separating the solution from the aluminum.

2. The process of claim 1 wherein the solution has a temperature of from 74 to 78° C.

References Cited in the file of this patent

UNITED STATES PATENTS 566,324  Kendrick _____ Aug. 25, 1896